Jan. 6, 1925.
A. G. CHRISTENSEN
GUARD FOR PLOWS
Filed Nov. 15, 1923
1,521,753
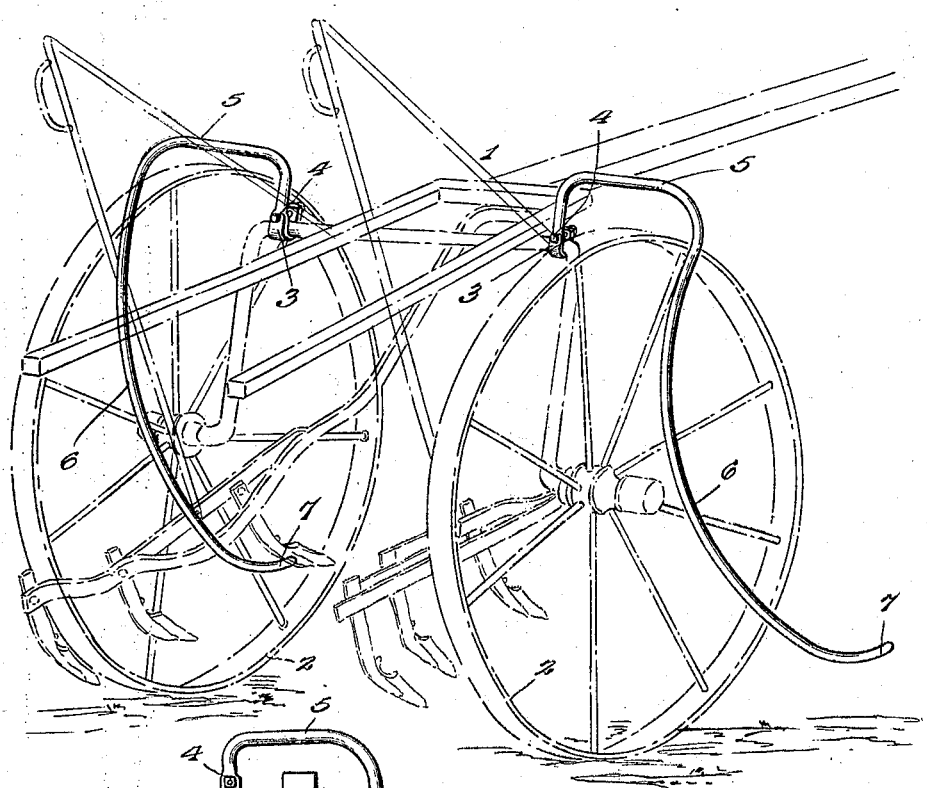
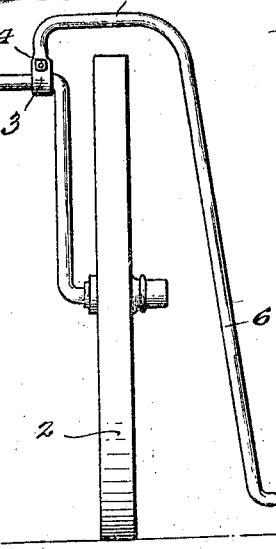
Inventor
A. G. Christensen
By Lacy & Lacy, Attorneys Patented Jan. 6, 1925.

1,521,753

UNITED STATES PATENT OFFICE.

ARTHUR G. CHRISTENSEN, OF PIPESTONE, MINNESOTA.

GUARD FOR PLOWS.

Application filed November 15, 1923. Serial No. 674,860.

*To all whom it may concern:*

Be it known that I, ARTHUR G. CHRISTENSEN, a citizen of the United States, residing at Pipestone, in the county of Pipestone and State of Minnesota, have invented certain new and useful Improvements in Guards for Plows, of which the following is a specification.

This invention is a guard for plows and cultivators and provides a simple device which may be readily attached to a wheeled plow or cultivator to run at the side of the same and pick up fallen stalks so that they will be raised out of the path of the wheels or the ground-engaging blades or other elements of the implement and thereby prevented from being crushed or broken so that the crop will be curtailed. The invention is illustrated in the accompanying drawing and consists in certain novel features which will be particularly pointed out in the claim following a detailed description.

In the drawing:

Figure 1 is a perspective view of a wheeled cultivator having my improved guard applied thereto, and Fig. 2 is a rear elevation of one wheel of the implement with the guard in position for use.

The cultivator, indicated at 1 more or less conventionally, may be of any well-known or preferred type and is supported upon wheels 2 which are adapted to run in the furrows of the field between the hills or rows which are to be cultivated. It is a frequent experience to find crops, such as corn, badly bent and even thrown down flat upon the ground in climates where heavy windstorms are of frequent occurrence. With the ordinary cultivators, the plants which have been blown over or thrown to the ground are lost inasmuch as the cultivator wheels will ride over the same and crush or break the stalks so that the corn will not develop and a very serious diminution of the crop is occasioned. To meet these conditions, I provide a guard consisting of a light rod provided at one end with a U-shaped attaching ear or clip 3 which is adapted to partly encircle the axle or some fixed part of the frame of the cultivator or plow and be secured thereto by a bolt 4. From this attaching ear, the rod is carried upwardly and outwardly to define an arch 5 extending over the adjacent wheel 2 and from the outer end of the arch the guard extends downwardly, outwardly and forwardly, as at 6, in a sweeping curve terminating in a substantially straight portion 7 adapted to run close to the ground and pass under any stalks which may have been blown down or have fallen. As the forward travel of the implement continues, the terminal 7 will continue to ride under the fallen stalk and the downwardly, forwardly and outwardly curved main portion 6 of the guard will be thereby caused to engage the stalk and lift the same to turn it aside out of the path of the wheel.

My guard is exceedingly simple so that it may be very easily produced at a low cost and may be very readily fitted to any cultivator or plow without requiring any change in the construction of the implement. The securing bolts 4 pass through the attaching ears and clamp the same upon the frame or axle of the cultivator and thereby secure the guard in proper position to bridge the wheel and engage the fallen stalks so as to lift them and turn them aside out of the path of the wheel.

Having thus described the invention, I claim:

A guard for wheeled agricultural implements consisting of a rod having an attaching ear at one end adapted to fit around and be secured to a fixed part of the implement at the inner side of the wheel, the rod rising from said ear to a point above the wheel, then extending outwardly over the wheel, and then extending downwardly, outwardly and forwardly at the outer side of the wheel with its terminal projecting forwardly near the ground.

In testimony whereof I affix my signature,

ARTHUR G. CHRISTENSEN. [L. S.]